Figure 19:
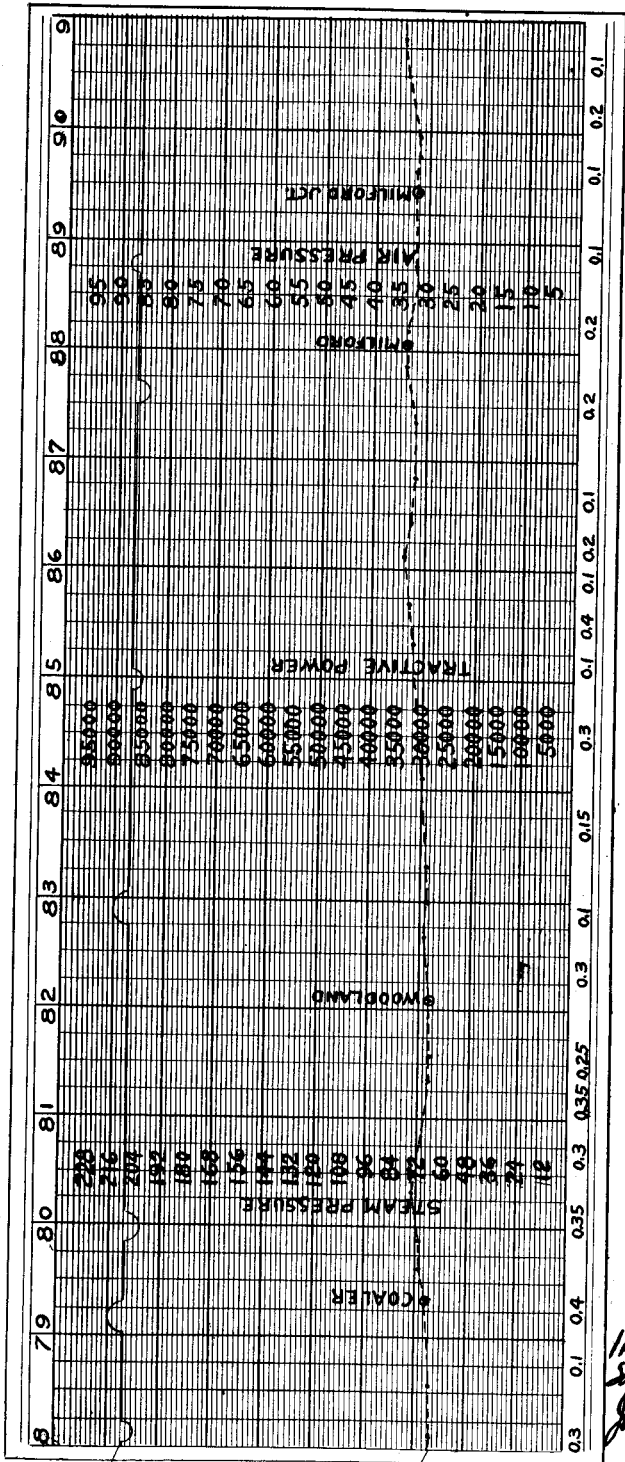

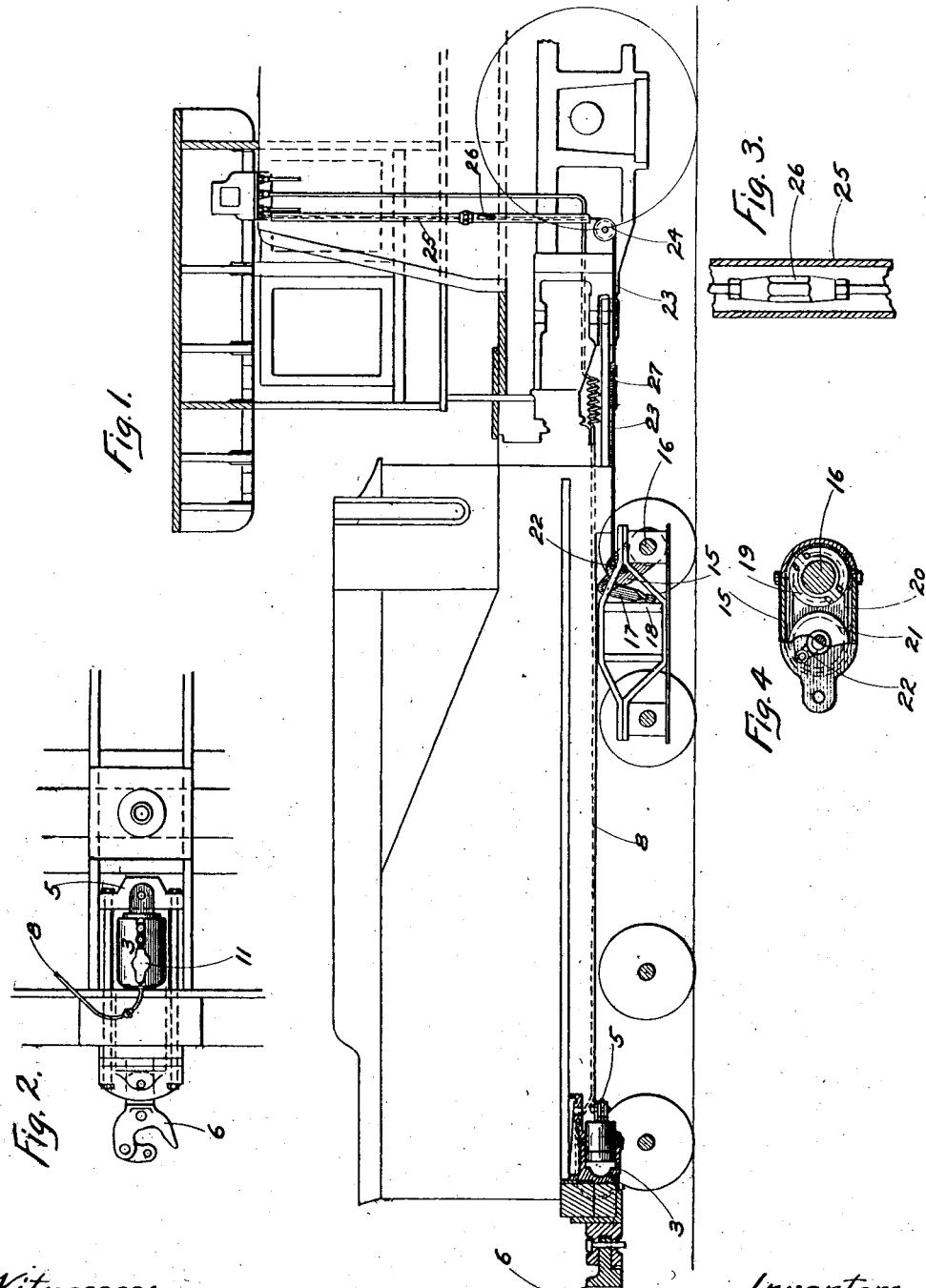

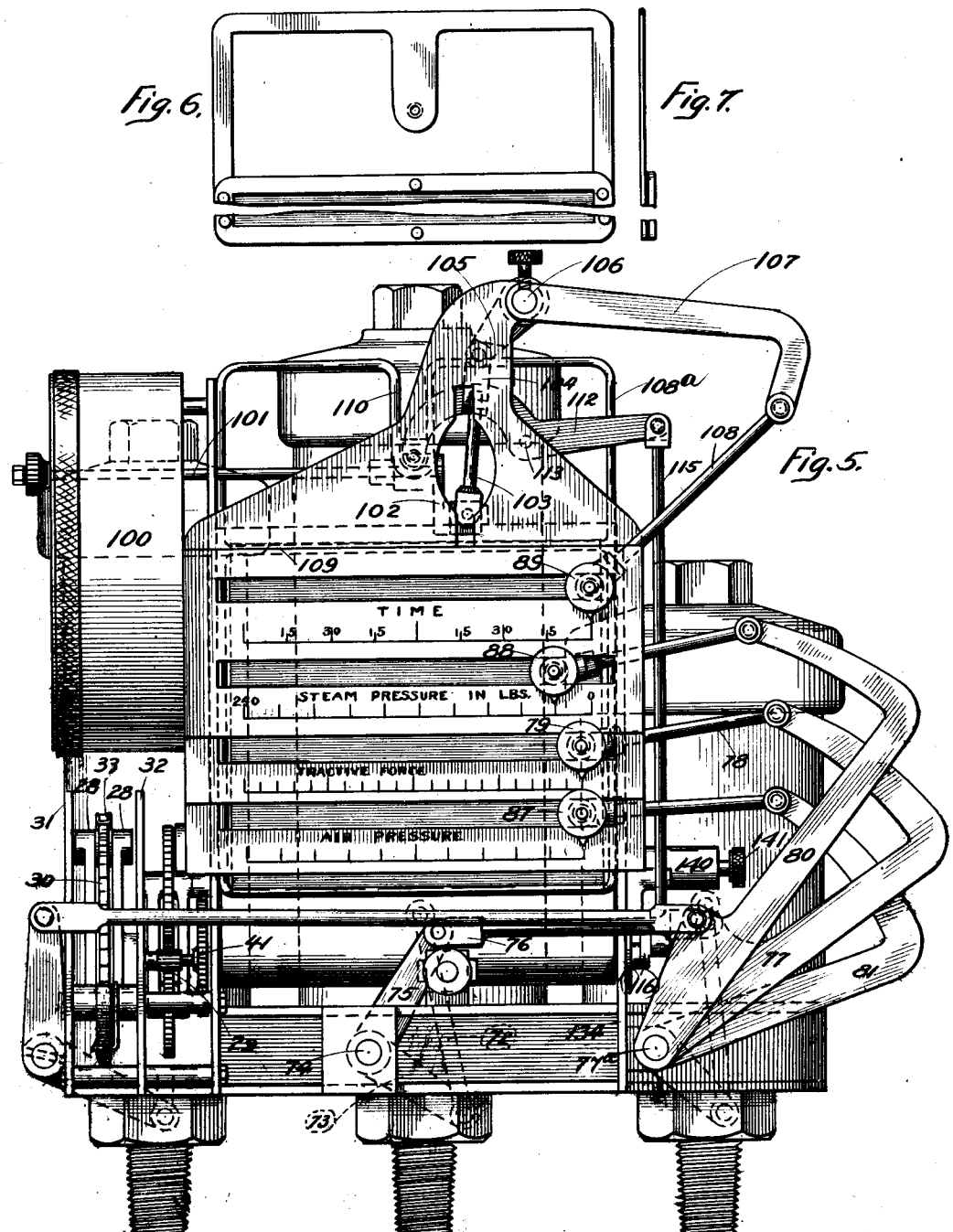

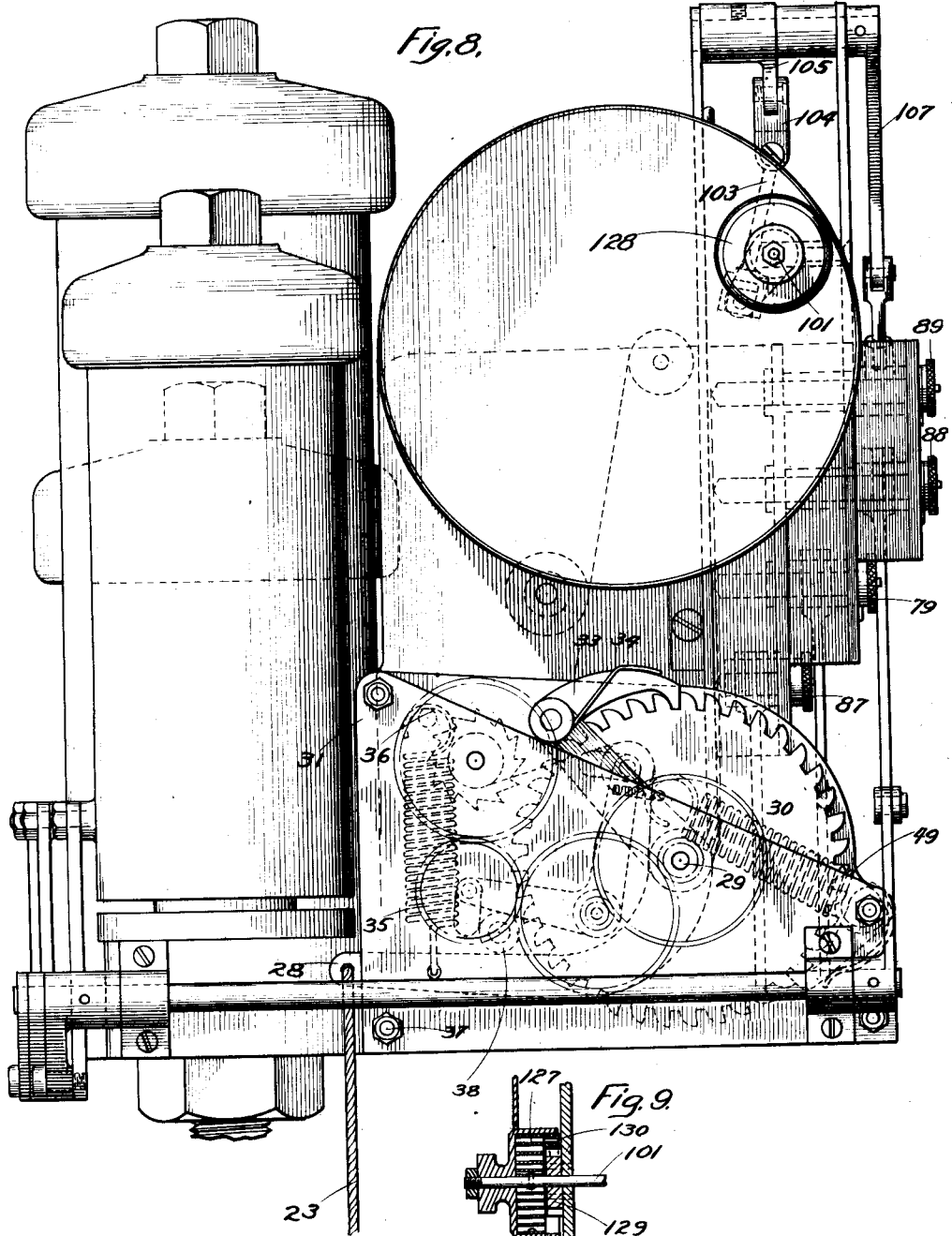

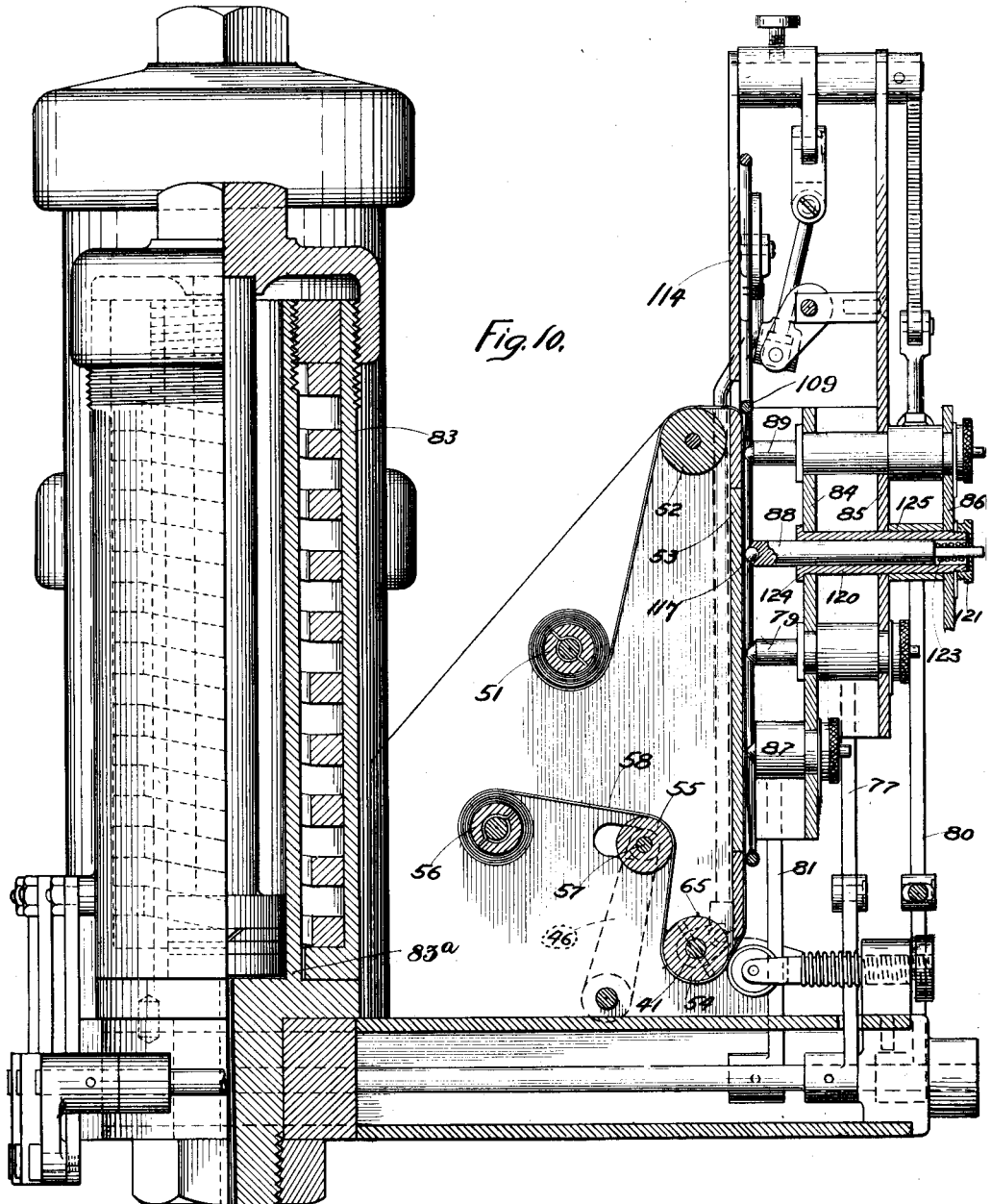

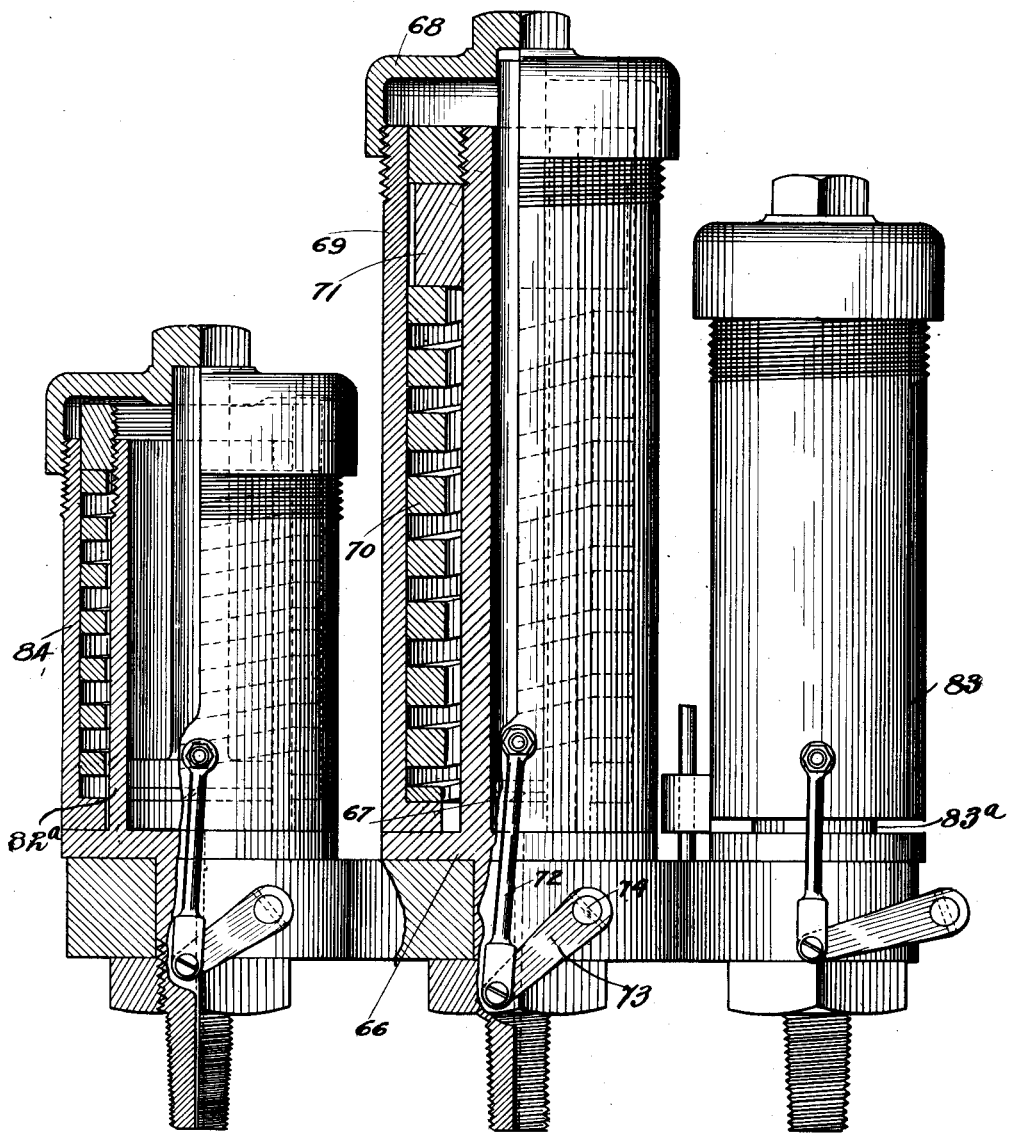

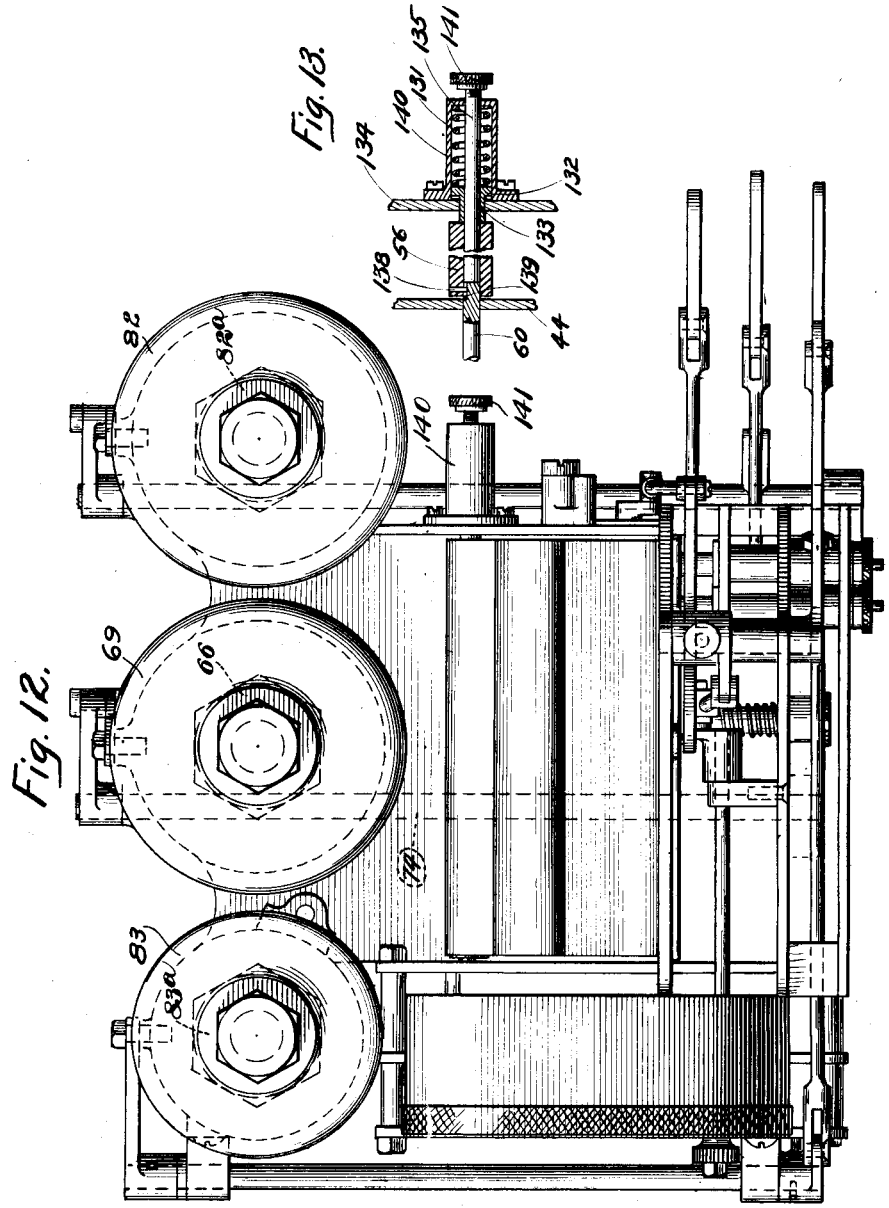

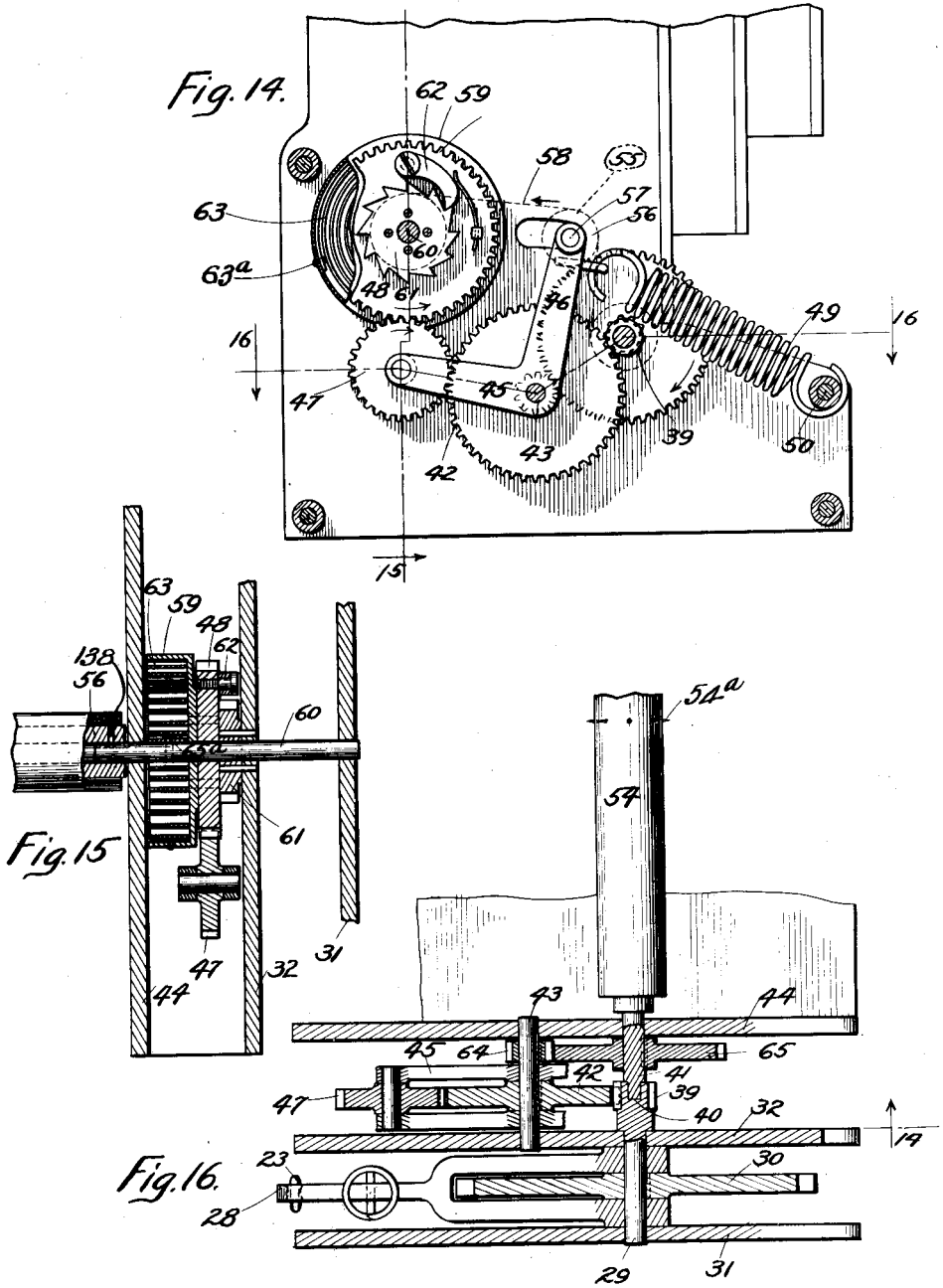

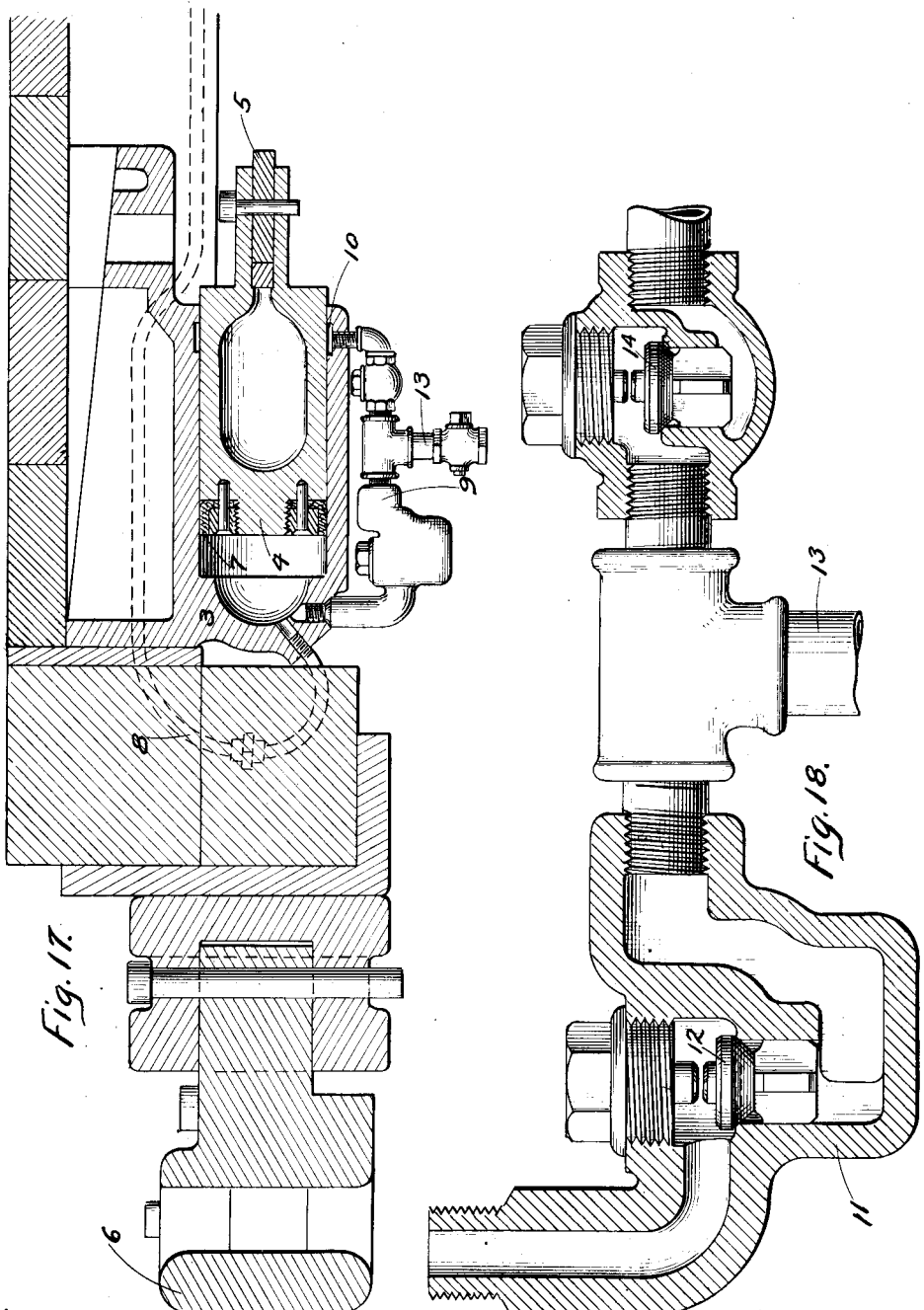

S. T. PARK & J. E. PHILLIPS.
RECORDING INSTRUMENT.
APPLICATION FILED NOV. 21, 1908.

1,138,011. Patented May 4, 1915.
9 SHEETS—SHEET 9.

UNITED STATES PATENT OFFICE.

SAMUEL THOMAS PARK AND JOHN EMMET PHILLIPS, OF DANVILLE, ILLINOIS, ASSIGNORS TO LOCOMOTIVE RECORDING DYNAMOMETER COMPANY, OF CHICAGO, ILLINOIS, A CORPORATION OF MAINE.

RECORDING INSTRUMENT.

1,138,011.          Specification of Letters Patent.          Patented May 4, 1915.

Application filed November 21, 1908. Serial No. 463,915.

*To all whom it may concern:*

Be it known that we, SAMUEL THOMAS PARK and JOHN EMMET PHILLIPS, citizens of the United States, residing at Danville, in the county of Vermilion and State of Illinois, have invented certain new and useful Improvements in Recording Instruments, of which the following is a specification.

The object of our invention is to improve the construction of railway recording devices, the special object of our improvements being to produce an instrument of this kind adapted for continuous use upon locomotives.

The particular nature of our invention will clearly appear from the following description and claims, together with the drawings forming part of this application.

While the description herein contained consists principally in an explanation of the specific embodiment of the invention shown in the accompanying drawings, in many particulars the invention is not confined to that specific embodiment, but resides in the novel features set forth in the claims, whether carried out by means of the particular mechanism herein illustrated or equivalent mechanism.

In the drawings—Figure 1 is a diagrammatic view of part of a locomotive and its tender, showing our invention applied thereto. Fig. 2 is a plan view of the main pressure cylinder in which the tractive force is initially received. Fig. 3 is a detail view of an adjusting device forming part of the flexible connection for actuating the paper feed mechanism. Fig. 4 is a detail view of the gearing connected to one of the track wheel axles. Fig. 5 is a front view of the indicating and recording instrument which is mounted upon the locomotive. Figs. 6 and 7 are detail views of a modified form of ribbon holder. Fig. 8 is a side view of the recording mechanism. Fig. 9 is a detail view of a supplemental spring used in connection with a clock. Fig. 10 is a fragmentary side view, partly in section, of the recording mechanism. Fig. 11 is a view of the recording mechanism from the back, showing certain parts in section. Fig. 12 is a plan view of the recording mechanism. Fig. 13 is a detail view of the means for holding the paper receiving roll. Fig. 14 is a detail view of the gearing and spring for operating the paper receiving or wind-up roll. Figs. 15 and 16 are plan views, partly in section, of the mechanism shown in Fig. 14, together with certain related parts. Fig. 17 is a sectional view of the pressure cylinder which is mounted upon the locomotive tender. Fig. 18 is a detail view, partly in section, of a by-pass connected to the cylinder shown in Fig. 17. Fig. 19 represents part of a record sheet used in the recording mechanism.

The embodiment of our invention illustrated in the drawings includes means for indicating and recording the tractive force exerted by the locomotive, the boiler steam pressure and the air pressure prevailing in the air brake system. The mechanism is so arranged that the pressures referred to are recorded by markers moving in adjacent parallel straight lines, thus producing pressure records which may be readily compared with each other, and with other data which may previously be recorded upon the strip of paper used in the machine, such as grades and curvature of track, station names, &c. The fact that the paper strip is moved proportionately to the speed of the train renders it possible to produce a record upon which the steam and air pressure and tractive pull prevailing at any given moment will be recorded at adjacent points upon the sheet and directly opposite the previously recorded information relative to curvature, grades, &c. In some instances, it is desirable that a blank record strip be used, and when a comparison is desired with the grades, curves, &c., of the road-bed, such comparison may be made by superposing over the record sheet a transparent strip of celluloid or other suitable material upon which the grades, curves, &c., have been recorded.

Referring to Fig. 19, line 1 representing the grades, line 2 representing curves, and the figures at the bottom of the sheet representing the percentage of the grades, instead of being printed upon the record sheet prior to its use in the machine, may be placed upon a separate transparent sheet as above explained. In fact, everything appearing upon the record sheet shown in Fig. 19, with exception of the pressure lines made by the recording instrument during the operation of the locomotive, may be placed upon such a transparent sheet, and the record read by superposing the same over the record sheet.

Referring now to the mechanism whereby the record is made, a pressure cylinder 3 is mounted preferably upon the locomotive tender, as shown in Figs. 1 and 17. Operating in the cylinder 3 is a plunger 4, which by means of a yoke 5 is connected to the coupler 6. At its inner end the plunger 4 is provided with a packing ring 7 of any desirable form, and the cylinder 3 is connected to the recording instrument upon the locomotive by means of pipe 8. Extending from the inner end of the cylinder 3 to a point adjacent the outer end thereof is a by-pass designated generally by the numeral 9, the purpose of which is to restore to the inner end of the cylinder any of the oil or other liquid used which may leak past the plunger packing. At the point where the outer end of the by-pass communicates with the cylinder, the latter is provided with an annular groove 10, for the purpose of collecting and returning into the by-pass the oil 10 leaking past the packing. The by-pass is provided with a trap 11 between which and the inner end of the cylinder is a check valve 12. For the purpose of providing means for conveniently filling the apparatus with oil, we provide an inlet 13 leading to the by-pass, said inlet being provided with a valve and screw connection. Between the inlet 13 and the outer end of the by-pass we provide a second check valve 14, also opening toward the inner end of the cylinder, the same being provided for the purpose of preventing oil pumped into the apparatus from escaping through the open end of the cylinder.

In operation, the tractive force exerted by the locomotive will cause pressure upon the liquid contained in the cylinder 3, and such pressure will be transmitted through pipe 8 to the recording instrument upon the locomotive. When the plunger moves outwardly, due to the cars coming together upon retardation of the train or other causes, any liquid which has leaked past the packing and flowed through the by-pass into the trap will be drawn back to the inner end of the cylinder.

Proceeding now to the recording mechanism mounted upon the locomotive, we will first describe the means for moving the web of paper upon which the various records are made. In order that the records may appear in proper relation to the point upon the road where such records were made, it is necessary that the speed of movement of the record sheet should be proportional to the speed of the train. We, therefore, actuate the paper feeding mechanism from one of the track wheel axles, preferably the forward axle of the tender. For this purpose a casing 15 is rotatably mounted upon the forward axle 16 of the tender and yieldingly secured by means of a pivotal connection with a link 17 attached to the truck frame 18, or other fixed part of the tender. By this means the casing 15 is prevented from rotating, while at the same time yieldingly held in such manner as to allow for the movement of the body of the tender upon the trucks. Secured to the axle 16 is a pulley 19, and a belt 20 communicates motion from the pulley 19 to a second pulley 21 also mounted in said casing. The shaft of the pulley 21 extends through the side of the casing 15 and is provided upon its outer end with a crank 22. Connected to the crank 22 is a cable 23 which may be made of any suitable flexible material. The cable 23 extends forward and around a pulley 24 upon the locomotive, and thence upwardly through a pipe 25 to the recording mechanism. A turn-buckle 26 affords means for adjusting the length of the cable 23. At some suitable point intermediate its length, a spring 27 is interposed in the cable 23 for the purpose of rendering it somewhat elastic, such elasticity being necessary for a purpose which will hereinafter appear. At its upper end the cable 23, as shown in Fig. 8, is connected to a pawl arm 28 which is pivotally mounted upon the shaft 29 of a ratchet wheel 30 which we will term the driving ratchet wheel. The pawl arm 28 is preferably forked, as shown in Fig. 16, and its bearing occupies the entire space between the frame plates 31 and 32. This pawl arm 28 takes the form of a bell crank lever, and a pawl 33 is pivotally mounted at its upper end, said pawl being held in engagement with the teeth of the ratchet wheel 30 by means of a spring 34. The lower extension of the pawl arm 28 is drawn upward by means of a coil spring 35 attached thereto at its lower end and at its upper end to a stud 36, which projects from the frame plate 31.

Referring now to Figs. 1 and 8, the length of the flexible cable 23 and the throw of the crank 22 are such that upon the forward stroke of the crank 22 there will be a certain amount of slack in said cable, even when, owing to curvature of the track or other cause, the distance between the locomotive and tender at the point where the cable 23 is located is temporarily increased. Upon the backward stroke of the crank 22, however, the cable 23 will always be taut and draw the pawl arm 28 downward against the tension of the spring 25. Upon the forward stroke of the crank arm 22 and the slacking of the cable, the spring 35 will draw the pawl arm 28 upward and the pawl 33 will then impart rotation to the ratchet 30. The spring 27 is of somewhat greater rigidity than the spring 35, in order that the pull upon the cable 23 may actuate the arm 28 against the tension of the spring 35, the elasticity of the spring 27 coming into play only after the arm 28 has received its full limit of motion and been arrested by contact with the stop 37 provided for that purpose. The upward movement of the arm 28 is limited by the stop 38. The shaft 29 of the driving ratchet 30 is continued through the frame plate 32, and provided at its end with a pinion 39 and also with a socket 40 which forms a bearing for the feed roll shaft 41. The pinion 39, as shown in Figs. 14 and 16, meshes with a gearing 42 whose shaft 43 rotates in bearings in the frame plates 32 and 44. Also rotatably mounted upon the shaft 43 is a bell crank lever 45—46. A gear 47 is mounted in the arm 45 of the bell crank lever 45—46 and meshes with the gear 42. The gear 47, however, may be engaged and disengaged with a gear 48, which I will term the spring gear, without disturbing the engagement between said gears 47 and 42. A spring 49 secured at one end to a fixed stud 50 and at its other end to the arm 46 of the bell crank lever 45—46 tends to hold the gear 47 in mesh with the spring gear 48.

The purpose of the mechanism just described and of certain other mechanism coöperating therewith is to secure proper movement of the web of paper upon which the records are made. Upon reference to Fig. 10, the arrangement of the web of paper will be apparent. The paper is fed from a supply roll 51 over a guide roll 52 in front of the table 53, around the feed roll 54, and over the pressure roll 55 to the receiving roll 56. The shaft 57 of the pressure roll 55 is mounted in the upper arm of the crank 45—46, as shown in Fig. 14. When under sufficient tension, the pressure of the web of paper 58 moves the arm 46 of the bell crank lever 45—46 rearwardly, as viewed in Fig. 14, thus carrying the gear 47 out of mesh with the spring gear 48 against the tension of the spring 49. When the web of paper becomes slack, the spring 49 draws the bell crank 45—46 in the opposite direction, thus throwing the gear 47 into mesh with the gear 48. The gear 48 is secured upon a spring drum 59, as shown in Figs. 14 and 15, said spring drum being mounted upon the shaft 60 of the paper receiving roll 56. Rigidly secured to the frame plate 32 is a ratchet 61, and a pawl 62 upon the face of the gear 48 co-acts therewith. The spiral spring 63 is secured at 63ª to the inside of the spring drum 59 and at 65ª to the shaft 60 of the paper receiving roll 56. The web of paper 58 is impelled by the tension of the spring 63 acting upon the receiving roll 56. When the spring 63 is wound up, the tension of the paper web 58, acting upon the pressure roll 55, shown in Fig. 10, is sufficient to move the bell crank lever 45—46 against the tension of the spring 49, thus throwing gear 47 out of mesh with the spring gear 48. The pawl 62, as shown in Fig. 14, prevents the spring drum from rotating, and hence the tension of the spring 63 acts to rotate the paper receiving roll 56. When the tension of the spring becomes lessened, the tension upon the paper web 58 is so reduced that the spring 49 acts upon the bell crank lever 45—46 and throws the gear 47 in mesh with the gear 48, whereupon, the rotation of the gear 42, acting through the gear 47, rotates the spring drum and winds up the spring. The rewinding of the spring again imparts greater tension to the paper web 58, thus causing it to act upon the pressure roll 55 and throw the gear 47 out of mesh with gear 48.

Through the mechanism above described, means are provided for imparting rotative movement to the receiving roll 56 through the coiled spring 63, and for rewinding the spring 63 by means of power derived from one of the track wheel axles when the tension of said spring becomes reduced. This mechanism provides a positive draft for the paper web and avoids recourse to friction clutches or equivalent devices for permitting variations in the diameter of the web of paper upon the receiving roll 56. The movement of the recording sheet is governed by an escape roll or distance roll 54. The roll 54 is actuated through a pinion 64 secured to shaft 43 and meshing with a gear 65 upon the shaft 41 of said roll 54. The roll 54, as shown in Figs. 10 and 16, is preferably provided with a series of points 54ª adapted to engage the web of paper 58 and prevent slipping of the paper upon said roll. Under the tension of the receiving roll spring 63, the paper 58 will be drawn from the supply roll 51 as fast as permitted by the rotation of the distance roll 54, and the rotation of the latter will be proportional to the speed of the train.

In order to wind the spring 63 of the paper receiving roll 56, it is necessary that its drum should be rotated at a higher speed than the movement of the distance roll 54, for the reason that the rotation of the distance roll 54 permits the unwinding of said spring. This is accomplished by properly proportioning the gears 42, 47, 48, 64 and 65, which gears are shown in Figs. 14 and 16. As will be noted by reference to those views, the circumferential velocity of the gear 42 is transmitted without reduction to the gear 48 through the gear 47, but the circumferential velocity of the gear 42 is reduced through the pinion 64 before being communicated to the gear 65. This arrangement results in imparting a higher speed to the spring drum 59 than to the distance roll 54.

The pressure imposed upon the fluid contained in the cylinder 3 is transmitted through the pipe 8 to the cylinder 66, shown in Fig. 11. Operating in the cylinder 66 is a plunger 67 connected at its upper end to a cap 68 in the lower edge of which is threaded the downwardly extending cylindrical sleeve 69, which is provided at its lower edge with an inturned annular shoulder. At its upper edge the cylinder 66 is provided with an outwardly directed annular shoulder, and between the shoulders upon the cylinder 66 and sleeve 69 is the spring 70. In the present instance, a spacing block 71 is shown between the upper end of the spring and the shoulder at the top of the cylinder, but the use of such spacing block will be dependent upon the relative length of the spring 70 and the cylinder 66. Of course, the parts might be so proportioned as to dispense with the spacing block 71. The upward movement of the plunger 67 will be resisted by the spring 70, and by properly proportioning said spring and the diameter of the cylinder, the amount of movement imparted to the cylinder sleeve 69 may be regulated.

The construction of the steam and air cylinder, shown in Fig. 11, is similar to that of the cylinder above described for recording the tractive force, and the connections between these pressure cylinders and the recording markers is of the same character, and hence detailed description of the connections extending from the tractive force cylinder to its marker will suffice. Pivoted to the sleeve 69 is a downwardly extending link 72, which at its lower end is pivotally connected to a crank arm 73 secured to a rock shaft 74 extending through the base of the machine from the back to the front. At its forward end the rock shaft 74 is provided with a crank arm 75 to the upper end of which is pivotally connected link 76. Link 76 at its opposite end is pivotally connected to angle lever 77, which in turn is pivoted to the frame of the machine at 77ª. At its upper end lever 77 is pivotally connected to the arm 78 which carries at its end the marker which is designated generally 79. Similar levers 80 and 81 have similar connections to the steam and air cylinders 83ª and 82ª. As shown in Fig. 10, the front of the machine is provided with a table 53 over which the paper web passes and with plates 84, 85 and 86 lying parallel thereto. The plates 84, 85 and 86 are provided with guide slots for the markers 79, 87, 88 and 89. The rock shafts extending from the cylinder sleeves 83, 69 and 82 are graduated in length, that from the cylinder 83ª being the longest. The levers 80, 77 and 81 by this means are permitted to move in parallel planes without conflict. Mounted at the left of the machine, as viewed in Fig. 5, is an ordinary clock mechanism 100, one of the shafts 101 of which is extended outside of the clock casing and provided with a crank arm 102. Pivoted to the crank arm 102 is a link 103, which at its upper end is pivotally connected to a knuckle 104, the latter in turn being pivoted to a crank arm 105 upon rock shaft 106. The pivotal connections referred to are disposed in planes lying at right angles to each other, in order to afford means for universal movement between the cranks 102 and 105. Fixed to the shaft 106 is a crank arm 107 which has a pivotal connection with an arm 108 carrying at its end marker 89. By the means described, marker 89 is given a back and forth movement proportional to the elapsed time, thus affording means upon the record sheet for determining the time interval between any two points thereon. The inclination of the time record line also forms a ready means for roughly approximating the speed of movement of the train at any given point.

We have found it most convenient to employ some ordinary clock mechanism, such as can be secured from clock manufacturers. When such a clock mechanism is used, however, it is necessary to reinforce its spring for the purpose of enabling it to do the additional work required of it. For this purpose, we attach to one of the shafts 101 of the clock mechanism, as shown in Fig. 9, a supplemental spring 127, the outer end of said spring being attached to a spring drum 128. Attached to the casing of the clock is a ratchet 129 with which a pawl 130 pivoted inside of the drum 128 coacts. The tension of the spring 127 is such that when wound it furnishes just sufficient additional force to supplement the main spring of the clock and enable it to do the extra work required.

In order to avoid the defects inherent in the use of ink or other pencils for making the record, we have adopted an inking ribbon, together with means for oscillating the same to bring fresh parts of the ribbon opposite the marking point, and have also devised a marking point or stylus of a form that effectually avoids friction upon the inking ribbon and consequent retardation of its oscillating movement and the possibility of dragging it out of its proper position and causing wrinkles and folds therein.

For the purpose of imparting an oscillatory movement to the inking ribbon, we mount the same in a wire frame 108ª, as shown in Fig. 5, or a similar frame of sheet metal, as shown in Figs. 6 and 7. The frame is approximately rectangular in form and constructed with a cross bar 109, the ribbon being attached to and stretched between the cross bar 109 and the lower bar of the frame. In the specific form shown in Fig. 5, the upper bar of the frame is provided with a downturned U- shaped bend 110 in the lower turn of which is fixed a bearing to which the lever 112 is pivoted, the latter being also pivoted at 113 upon the inner frame plate 114. At its outer end the lever 112 is connected by means of a link 115 with a crank 116 upon the shaft 41 of the distance roll. By this means the ribbon frame 108 is moved up and down, for the purpose of presenting new portions of the ribbon surface to the several markers.

In Fig. 10 the marker 88 is shown in section. This marker being similar to the others, a description thereof will suffice for all. The end of the stem of the marker 88 in process of manufacture is provided with a recess, the base of which is spherical in form. A steel ball 117 is fitted into the recess and the walls of the recess are then peened over the steel ball sufficiently to hold the same in place without, however, interfering with its freedom to rotate. In practice, we have found a steel ball to give most satisfactory results, but, of course, other materials might be employed. The marker proper is mounted in a sleeve 120, the outer end of which is closed by the screw cap 121. A spring 123 between the screw cap and a shoulder upon the stem of the marker serves to impart the requisite pressure upon the inking ribbon. By removing the screw cap, the stylus may be withdrawn. The inner end of the sleeve 120 is flanged, as shown at 124, and a supplemental sleeve 125 forms a coacting shoulder, thus causing the marker to be slidably held in the guide slots in the plates 84 and 85.

In order to provide convenient means for inserting and withdrawing the paper receiving roll 56, shown in Figs. 5, 13 and 15, the shaft 60 projects a short distance inside of the plate 44, to the left as shown in Fig. 15, to the right as shown in Fig. 13. The paper receiving roll 56 is provided with a cylindrical bore and at its inner end a pin 138 coacts with a slot in the end of the shaft 60. Upon the right-hand frame plate of the machines, as viewed in Fig. 5, a housing 140 is mounted, said housing containing a coiled spring 131 abutting at its outer end against said housing and at its inner end against a block 132. The block 132 is provided with a reduced extension 133 which projects inwardly through an opening in the frame plate 134. In inserting the roll 56, as shown in Fig. 13, the right-hand end of the same is pressed against the extension 133, thus affording sufficient clearance for the left-hand end to be passed over the end of the shaft 60 with the stud 138 in engagement with the slot 139. Spring 131 acting upon the block 132 will hold the roll 56 in engagement with the shaft 60 and the spindle 135 can then be inserted to provide a secure bearing for the roll. A thumb nut 141 at the end of said spindle provides a convenient means for handling it.

We claim:

1. In a recording device for railway trains, paper feeding mechanism mounted in a locomotive and comprising a ratchet wheel, a pawl and pawl arm, a spring impelling said pawl arm in operative direction, a crank arm geared to one of the tender track wheels, and a flexible connection between said pawl arm and said crank arm, said connection comprising a spring of higher resistance than said pawl arm spring, the length of said flexible connection being such that in one position of said crank arm said connection will be slack and in the opposite position will be taut and actuate said pawl arm.

2. In a recording device for railway trains, paper feeding mechanism mounted in a locomotive and comprising a ratchet wheel, a pawl and pawl arm, a spring impelling said pawl arm in operative direction, a crank arm geared to one of the tender track wheels, and a flexible connection between said pawl arm and said crank arm, said connection comprising a spring of higher resistance than said pawl arm spring, the length of said flexible connection being such that in one position of said crank arm said connection will be slack and in the opposite position will be taut and actuate said pawl arm, the slack in said connection being sufficient to accommodate the variations in the relative positions of the locomotive and tender due to track curvature and other causes.

3. In combination with a railway locomotive and tender, a recording device comprising paper feed rolls, a casing rotatably embracing one of the track wheel axles and yieldingly connected to a fixed part of the vehicle on which it is mounted, a shaft in said casing and extending to the outside thereof, gearing in said casing between said shaft and axle, and actuating connections between said shaft and feed rolls.

4. In combination with a railway locomotive and tender, a recording device comprising paper feed rolls, a pulley secured to one of the track wheel axles, a casing surrounding said pulley and rotatably embracing said axle, said casing having a yielding connection with a fixed part of the vehicle on which it is mounted, a second pulley in said casing, and connections from said second pulley extending through said casing to said paper feed rolls.

5. In a recording device for vehicles, a series of fluid pressure recording devices, paper feeding mechanism, actuating connections between said paper feeding mechanism and one of the vehicle wheels, an oscillating inking ribbon frame, and connections between said frame and one of the vehicle wheels.

6. In a recording instrument for railway trains, an inking ribbon frame, a guideway for said frame, a lever connected at one end to said frame, actuating connections between said lever and one of the track wheel axles, and a marker comprising a freely rotatable sphere adapted to coact with said ribbon.

7. In a recording device for railway trains, paper feeding mechanism mounted in a locomotive and comprising a ratchet wheel, a pawl and pawl arm, a spring impelling said pawl arm in operative direction, a crank arm geared to a tender track wheel, and connections by which said crank arm may actuate said pawl arm in a direction opposed to said spring irrespective of the relative positions of said locomotive and said tender due to track curvature and other causes.

8. In a recording device for railway trains, paper feeding mechanism mounted in a locomotive, a spring adapted to actuate said mechanism, and means for retracting said spring and imparting tension thereto at intervals in unison with the movements of a track wheel, said mechanism being at rest during the retracting movement of said spring.

9. In a device of the class described, a series of cylinders and plungers, a recording marker and indicator for each cylinder and plunger, a movable inking ribbon common to all said markers, rectilinear guides for said indicators and markers arranged in close relation to facilitate observation of said indicators and of the record, and connections between said cylinders and plungers and their respective indicators and markers.

10. In a device of the class described, a series of cylinders and plungers, a clock, a recording marker and indicator for each of said cylinders and plungers and for said clock, a movable ink ribbon common to all said markers, parallel rectilinear guides for said indicators and markers, and connections extending therefrom to said cylinders and plungers and said clock.

In testimony whereof, we have subscribed our names.

SAMUEL THOMAS PARK.
JOHN EMMET PHILLIPS.

Witnesses:
RICHARD F. LLOYD,
JOHN H. BEGGS.